United States Patent [19]

Meltsch

[11] Patent Number: 4,792,472
[45] Date of Patent: Dec. 20, 1988

[54] WRAP-AROUND CABLE SLEEVE LINER AND METHOD OF MAKING

[75] Inventor: Hans J. Meltsch, Schwerte, Fed. Rep. of Germany

[73] Assignee: RXS Schrumpftechnik-Garnituren GmbH, Fed. Rep. of Germany

[21] Appl. No.: 62,679

[22] Filed: Jun. 16, 1987

[30] Foreign Application Priority Data

Jun. 19, 1986 [DE] Fed. Rep. of Germany ....... 3620522

[51] Int. Cl.⁴ .................. H02G 15/08; H01B 13/26
[52] U.S. Cl. .................... 428/35.9; 156/52; 156/53; 156/210; 174/92; 428/167; 428/183; 428/36.91
[58] Field of Search ................. 428/36, 167, 183, 458; 156/52, 53, 210; 174/84 R, 92

[56] References Cited

U.S. PATENT DOCUMENTS

| 1,189,140 | 8/1915 | Lane | 428/183 |
| 2,642,372 | 2/1950 | Chittick | 428/183 |
| 4,258,092 | 3/1981 | Labar | 428/167 |
| 4,511,611 | 4/1985 | Moisson | 428/167 |
| 4,656,316 | 4/1987 | Meltsch | 174/92 |

FOREIGN PATENT DOCUMENTS 0120475 3/1984 European Pat. Off. .

*Primary Examiner*—George F. Lesmes
*Assistant Examiner*—James J. Seidleck

[57] ABSTRACT

A wrap-around cable sleeve liner is formed from a blank consisting of a smooth covering sheet and a corrugated sheet, which are secured together and have a line of indentations extending at an angle to the corrugations of the corrugated sheet adjacent each end of the sheet to form a bend line for the adaptation portions. The cable sleeve liner blank is preferably cut from a large area panel and has the indentations formed after cutting the blank so that blanks for different sizes can be formed as needed.

16 Claims, 2 Drawing Sheets

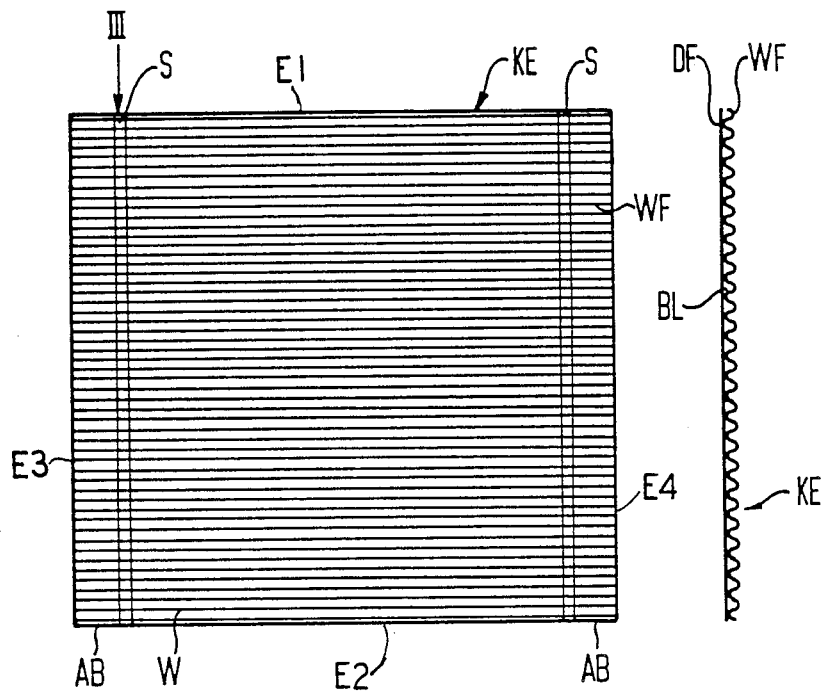
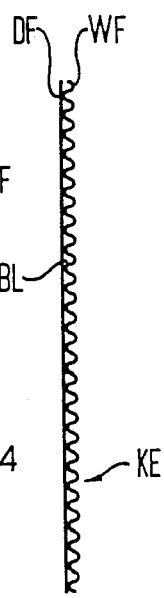
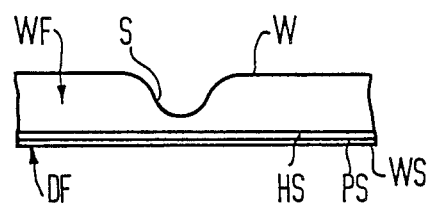

WRAP-AROUND CABLE SLEEVE LINER AND METHOD OF MAKING

BACKGROUND OF THE INVENTION

The present invention is directed to a wrap-around cable sleeve liner made from a blank having a smooth covering layer or sheet superimposed and connected to a corrugated sheet or layer with each of the sheets being formed by a plurality of layers of material.

A wrap-around cable sleeve liner for a shrink-fit cable is known from European Patent Application EP No. 0 120 475, which discloses two sandwich layers being disposed to lie one over the other. One of these sandwich layers has a corrugated form and extends over the entire area to be covered whereas the second sandwich layer exhibits a smooth form or surface and is only applied on the first sandwich layer in the center area between the two adaptable marginal areas of the cable sleeve liner. This second sandwich sleeve layer, which is applied in the center area increases the strength and thermal protection whereas the marginal areas with the exposed corrugations serve for adaptation of the cable sleeve liner to different diameters. This means that a specific cable sleeve liner with a definite diameter and length must be kept in stock for each type of sleeve.

SUMMARY OF THE INVENTION

The object of the present invention is to create a blank for a cable sleeve liner which blank can be used universally for any cable sleeve that is encountered and also meets the defined conditions in the same way. This object is achieved with the aid of a wrap-around cable sleeve liner blank which is composed of two cohering sandwich layers or sheets which are cut from an enlarged panel or sheet to any desired size. Preferably, one of the two sheets is a smooth covering sheet and the other sheet, which will be an internal sheet, is a corrugated sheet with both sheets having the same size and extending over the entire cable sleeve area. The corrugated sheet can be provided with a continuous line of indentations extending at an angle to the corrugations so that the blank of two sandwich sheets can be bent along the line of indentations to form adaptations for differences in the diameter between the wrap-around cable sleeve and the cables introduced into the cable sleeve.

The invention is also directed to the method of producing the blank for the cable sleeve liner which method comprises the step of providing a large area panel or sheet made up of a smooth covering sheet and a corrugated layer joined together; cutting a blank for the cable sleeve liner of the desired size from said large area panel; forming a line of indentations extending at an angle to the direction of corrugations of the corrugated sheet adjacent the two ends of the corrugation to delineate adapting end areas for engaging a cable; wrapping the sheet around the object to be covered with the corrugated sandwich layer being an interior layer; and then bending the adapting areas along the line of indentations to compress the adaptation areas onto the object extending out of the wrapped around liner. The step of forming the indentations preferably comprises applying a heated tool to the ridges of the corrugations to cause the line of indentations.

The advantages of the cable sleeve compared with the existing state of the art is first that it is only necessary to produce a single large area sheet or panel which is sufficient for the requirements. This large area sheet can be supplied in pieces or rolls and then only the breadth of the large area is determined by the possible production breadth. This means that, when required, a blank of the size that is actually needed can be cut from the existing large area panel with the precise dimensions required. Once this blank has been cut out, the bend lines for the two lateral adapting areas can be determined freely and exactly according to the requirements for the adapting areas. Here, again, the dimensions are completely optional so that, for example, even different adapting pieces are possible when, for example, cables with different diameters are introduced into wrapped around liner. These examples show that this cable sleeve liner, in accordance with the invention, can be easily adapted optimally and universally for all possible applications.

BRIEF DESCRIPTION OF THE DRAWINGS

FIG. 1 is a plan view of a blank for a cable sheet liner in accordance with the present invention;

FIG. 2 is an end view of the blank of FIG. 1;

FIG. 3 is an enlarged side view taken in the direction of arrow III of FIG. 1;

DESCRIPTION OF THE PREFERRED EMBODIMENTS

Figure 5:
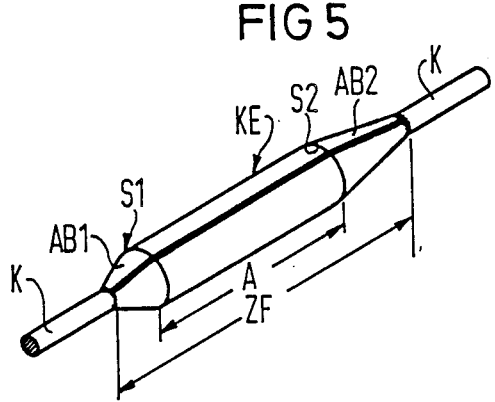
FIG. 5 illustrates the cable sleeve liner of the present invention being wrapped around the cable in accordance with the present invention.

The principles of the present invention are particularly useful when incorporated in a cable sleeve liner which is generally indicated at KE and is illustrated in FIG. 1 as a flat blank and is illustrated in a wrapped around state in FIG. 5.

The cable liner sleeve or blank KE of FIGS. 1 and 2 is composed of a corrugated sheet WF, which is made up of a plurality of sandwiched together layers. The corrugated sheet WF is securely applied to an underlying covering sheet DF, which is illustrated in FIG. 2. The dimensions illustrated in FIG. 1 are for a complete cable sleeve liner blank and the underlying smooth cover sheet DF extends over the full extent of the corrugated sheet WF. As illustrated, the corrugated sheet WF has corrugations extending parallel to the sides or edges E1 and E2 are perpendicular to ends E3 and E4. The liner KE is wrapped around an object with the corrugations running in the axial direction of the object to be wrapped, such as cables, and preferably facing inward when in the wrapped condition so that the smooth covering sheet DF is visible from the exterior. Therefore, when the shrink-fit sheath is fitted over the liner KE, the result is a smooth outer surface. As the object to be sheathed is generally of a different diameter to the object introduced, adaptations for the different diameters are necessary and are achieved by compressing the two outer adapting areas, such as AB, which are adjacent the ends E3 and E4. To facilitate the compression of the adapting areas AD, a break edge, which is caused by a line S of indentations in the corrugations W of the corrugated sheet WF, is provided. As illustrated, the two lines S of indentations extends substantially parallel to the ends E3 and E4 and preferably are at right angles to the axis of the corrugations W. To form the line of indentations, a folding tool is moved across the corrugations and is preferably heated so that the plastic layers forming the sandwich sheet can be easily deformed. These indentations can be made at any point so that the length of the adapting area AB is optional and can be selected for the particular job or application. As illustrated in FIG. 1, the two adaptation areas AB have approximately the same length, however, as explained hereinafter, when necessary or desired they can have different lengths.

As best illustrated in FIG. 2, the cable sleeve liner is cut to size with the structure comprising the two sandwich sheets formed by a covering sheet DF and a corrugated sheet WF. These two sheets are mutually secured to each other by means of an adhesive sheet on both of the sandwich layers which face one another and are glued or fused together along a common contact lines, such as BL, which is a point of contact between the liner surface of the sheet DF and the crown of each corrugation.

As illustrate in FIG. 3, the corrugated sheet WF is applied to the smooth covering sheet DF and is indented so that the corrugation W is weakened or interrupted at the point of the lines of indentations. This makes it easy to bend the cable sleeve liner along the line S of indentations and, thus, adapt it accordingly. FIG. 3 also shows the sandwich sheet construction for the covering sheet DF is made of, for example, three individual layers or sub-layers comprising an adhesive layer HS, a permeation protection layer PS, and a thermal protection layer WS. In a similar way, the corrugated sheet WF can also be composed of the same three layers which may have either the same thickness and number or can differ in number and in thickness.

A fusible plastic, preferably polyethylene, is used for the adhesive layer HS and the thickness of the layer preferably lies between 15 and 40 $\mu$m. The permeation protection layer PS is preferably made of a metal foil or layer, such as aluminum, and preferably has a thickness in a range of 15-40 $\mu$m. In particular, for the covering sheet DF, the layer PS has a thickness of 15-40 $\mu$m and preferably it is in a range of 15-25 $\mu$m. For the corrugated sheet WF, the permeation protection layer PS, if different than the layer for the covering sheet DF, has a thickness in the range of 30-60 $\mu$m, and preferably a range of 30-40 $\mu$m. The thermal protection layer WS, which extends on the exposed surfaces of each of the sheets, is preferably of a plastic and is, for example, a polyester (PETP), and is applied in a thickness of a range of 10-80 $\mu$m. Preferably, for the covering sheet the layer WS has a thickness in a range of 10-15 $\mu$m, and for the corrugated sheet, it has a thickness in the range of 70-80 $\mu$m.

A typical example of a cable sleeve liner exhibits the following sandwich layer: the cover sheet has an adhesive layer HS made of a 25 $\mu$m thick layer of polyethylene, a permeation protection layer PS made of a 20 $\mu$m thick layer of aluminum and a thermal protection layer WS made of a 12 $\mu$m thick layer of polyester (PETP). The corrugated sheet is composed of an adhesive layer HS made of a 25 $\mu$m thick layer of polyethylene, a permeation protection layer PS made of a 35 $\mu$m thick layer of aluminum, and a thermal protection layer WS made of a 75 $\mu$m thick layer of polyester (PETP).

Figure 4:
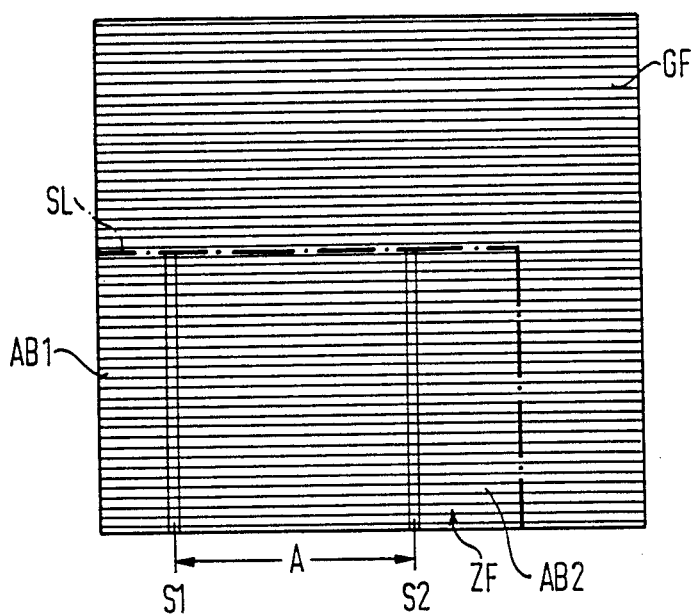
FIG. 4 is a plan view of a large area panel in accordance with the present invention.

FIG. 4 shows the universal adaptability of forming the cable sleeve liner blank KE in accordance with the present invention. As illustrated in FIG. 4, a large area panel or sheet GF, which is composed of the two already cohering sandwich layers or sheets DF and WF, is provided. From this large area sheet GF, a blank of a cut area ZF of a specific dimension is cut. The size of the large area of the panel GF is only determined by production conditions, such as, for example, the possible dimensions for the production machines. The manufactured large area panel GF with the complete structure is then either stored as a piece or in a roll until the required piece is cut to size. This eliminates the need to produce and keep stocks of blanks of different sizes and shapes. After cutting along the cut lines SL, which extend parallel to the direction of corrugations and transverse to the direction of corrugation W the area or size of the blank for the cable sleeve liner is determined. The length of the center portion of the cable sleeve liner KE can be freely determined by appropriate choice of the spacing A between the two lines S1 and S2 for the indentations. It is also possible to make the adapting areas AB1 and AB2 of different lengths according to the particular requirements, as illustrated in FIG. 4. This allows optimum adaptation to different changes in diameter at both ends of the cable sleeve insert or liner.

After forming the blank for the cable sleeve liner KE, it can be wrapped around a cable splice for cables K, as illustrated in FIG. 5. After being wrapped around a cable K, the liner is bent along the lines S1 and S2 to compress the two outer ends AB1 and AB2 of the cut area or blank ZF onto the two diameters of the two cables K and thereby adapt the liner thereto. The sketch indicates that the two adapting areas AB1 and AB2 are of different lengths and the adapted cable sleeve liner KE can easily be covered with a shrink-fit sheath, which forms a seal with the cable sleeve liner KE providing the desired support over the entire area of the cable sleeve.

Although various minor modifications may be suggested by those versed in the art, it should be understood that I wish to embody within the scope of the patent granted hereon all such modifications as reasonably and properly come within the scope of my contribution to the art.

I claim:

1. A wrap-around cable sleeve liner comprising a blank made of an outer smooth covering sheet cohering to a corrugated sheet, each of the sheets being of the same size and being a sandwich sheet of a plurality of layers of material, the blank being cut from a large area panel of the two cohering sheets to a desired size with corrugations of the corrugated sheet running along one edge and terminating at the ends of said blank, two lines of indentations being provided in the corrugations, said lines extending substantially parallel to the ends of the blank and extending at an angle to the corrugations of the corrugated sheet to form a bend line adjacent each end of the blank so that the ends of the liner can be bent on said bend lines to be adapted to different diameters of cables introduced into the wrap-around cable sleeve liner.

2. A wrap-around cable sleeve liner according to claim 1, wherein each of the sandwich sheets is made of three layers of material, one layer being provided as an adhesive layer, the second layer being a permeation protection layer and the third layer being a thermal protection layer.

3. A wrap-around cable sleeve liner according to claim 2, wherein each of the adhesive layers of the smooth sheet and the corrugated sheet are formed of polyethylene and the two sheets are connected together with the polyethylene adhesive layers being in contact and fused together.

4. A wrap-around cable sleeve liner according to claim 2, wherein each of the thermal protection layers is made of polyester.

5. A wrap-around cable sleeve liner according to claim 2, wherein each of the permeation protection layers is made of aluminum.

6. A wrap-around cable sleeve liner according to claim 2, wherein each of the adhesive layers is made of polyethylene.

7. A wrap-around cable sleeve liner according to claim 2, wherein the thicknesses of the thermal protection layers lie in a range of 10–80 μm.

8. A wrap-around cable sleeve liner according to claim 2, wherein the thicknesses of the permeation protection layers lie in a range of 15–40 μm.

9. A wrap-around cable sleeve liner according to claim 2, wherein the thickness of the adhesive layers lies in a range of 15–40 μm.

10. A wrap-around cable sleeve liner according to claim 2, wherein the thicknesses of the corresponding layers of material for the smooth covering sheet and the corrugated sheet are substantially the same.

11. A wrap-around cable sleeve liner according to claim 2, wherein the thicknesses of the layers of material of the corrugated sheet are different to the thicknesses of the corresponding layers of the materials of the covering sheet.

12. A wrap-around cable sleeve liner according to claim 11, wherein the thicknesses of the thermal protective layer is 10–15 μm for the covering sheet and in a range of 70–80 μm for the corrugated sheet.

13. A wrap-around cable sleeve liner according to claim 11, wherein the thicknesses for the permeation protection layers is 15–25 μm for the covering sheet and 30–40 μm for the corrugated sheet.

14. A wrap-around cable sleeve liner according to claim 1, wherein each of the covering sheet and corrugated sheet are provided with an adhesive layer which is fusible through the action of heat, said sheets being connected to one another by said fusible adhesive layer.

15. A method for producing a wrap-around cable sleeve liner and subsequently wrapping the liner about a conductor, said liner having a covering sheet joined to a corrugated sheet with the corrugations of the corrugated sheet extending parallel to edges of the liner and substantially at right angles to the end of the liner, said method comprising the step of providing a large area panel made up of the smooth covering sheet cohering to the corrugated sheet; cutting a blank for the sleeve liner from said large area panel with the desired dimensions and edges of the blank extending parallel to the direction of corrugations of the corrugated sheet and the ends extending transverse thereto; providing a line of indentation extending transverse to the direction of the corrugations adjacent each of the ends of the blank to form an adapting area adjacent each of the ends, wrapping the liner blank around an object to be covered with the direction of wrapping being transverse to the direction of the corrugations and with the corrugations being on the inner surface; and then bending the adapting areas along the line of indentations down onto the objects extending outwardly from the ends of the liner.

16. A method according to claim 15, wherein the step of providing a line of indentations includes moving a heated tool across the corrugations to permanently deform the corrugations to form the line of indentations.

* * * * *